United States Patent [19]
Gotoh et al.

[11] 3,818,434
[45] June 18, 1974

[54] APPARATUS FOR PREVENTING A MOTORCAR FROM BEING DRIVEN BY A DRUNK DRIVER

[75] Inventors: Masanori Gotoh, Tokyo; Tadao Hirano, Kawage-machi; Sadasuke Toda, Suzuka; Katuo Okugawa, Suzuka; Kazutaka Monden, Suzuka, all of Japan

[73] Assignee: Honda Giken Kogyo Kabushiki Kaisha, Tokyo, Japan

[22] Filed: Oct. 26, 1972

[21] Appl. No.: 300,996

[30] Foreign Application Priority Data
Oct. 27, 1971  Japan.............................. 46-84639

[52] U.S. Cl..................... 340/53, 340/279, 180/99, 73/421.5 R
[51] Int. Cl....................... G08b 21/00, B60r 18/00
[58] Field of Search............ 340/52 R, 53, 237, 279; 180/82.7, 99; 128/2 C; 73/421.5 R

[56] References Cited
UNITED STATES PATENTS
3,186,508  6/1965  Lamont............................... 180/99

*Primary Examiner*—Alvin H. Waring
*Attorney, Agent, or Firm*—Waters, Roditi, Schwartz & Nissen

[57] ABSTRACT

An apparatus for preventing a motorcar from being driven by a drunk driver in which a detecting device for detecting the alcohol content contained in the breath of the driver is mounted within the passenger compartment in front of the driver. Upon operation of the detecting device, the motorcar is rendered inoperative. There is also provided a release device adapted to be rendered operative a predetermined period of time after the detecting device no longer detects the alcohol content, so that upon operation of the release device, the motorcar is rendered able to be driven.

6 Claims, 3 Drawing Figures

APPARATUS FOR PREVENTING A MOTORCAR FROM BEING DRIVEN BY A DRUNK DRIVER

BRIEF SUMMARY OF THE INVENTION

The invention relates to apparatus for preventing a motorcar from being driven by a drunk driver.

Traffic accidents caused by drunk drivers not only represent a significant portion of all automobile accidents but they frequently involve fatalities. However, an effective apparatus for preventing such kinds of accidents has not yet been developed.

An object of this invention is to provide a novel and simple apparatus for preventing drunken driving of a motorcar by rendering the motorcar inoperative when a drunk person tries to drive the car, but enabling a person who is not drunk to drive the same motorcar.

For achieving this object, an alcohol detecting device is provided within the passenger compartment and is operative to disable the vehicle, there also being provided a release device adapted to be operative a predetermined period of time after the detecting device no longer detects the presence of alcohol. Upon operation of the release device, the motor car is made able to be driven.

DETAILED DESCRIPTION

Figure 1:
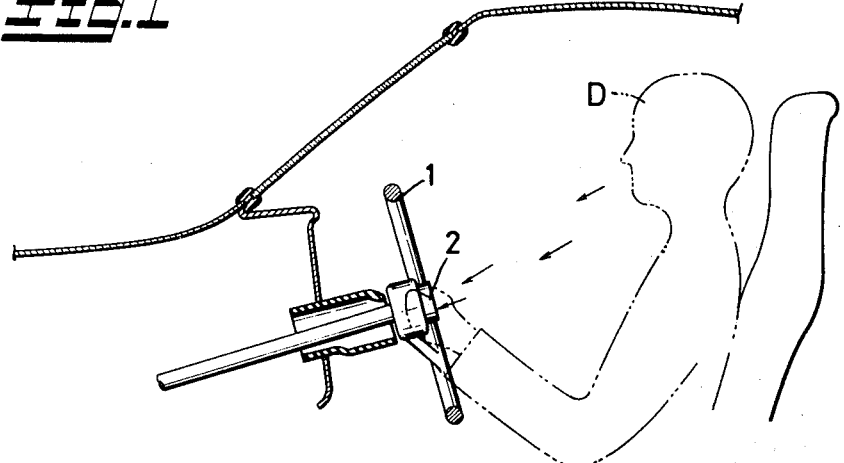
FIG. 1 is a diagrammatic side view showing the apparatus of this invention in section.
Figure 2:
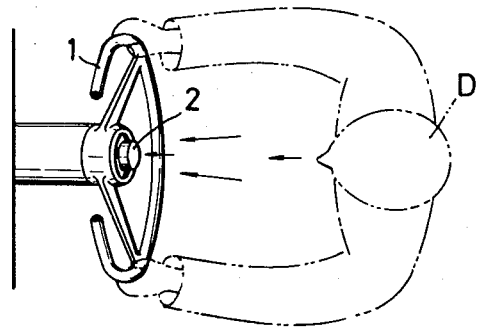
FIG. 2 is a top plan view of a portion thereof.

As shown in FIGS. 1 and 2, an alcohol detecting device 2 is installed at a location which is susceptible to the exhalation breadth of a driver D, for instance, at the center of a steering wheel 1. The detecting device 2 is, for example, constituted as a combustible gas detecting device in which a combustible gas is burned when brought into contact with a heated platinum filament to cause a change in the electric resistance of the filament by a rise in temperature of the filament due to such burning. Such combustible gas detecting devices are well known in the art and by way of example, reference is made to U.S. Pat. No. 3,507,145 which shows one such operative device.

Figure 3:
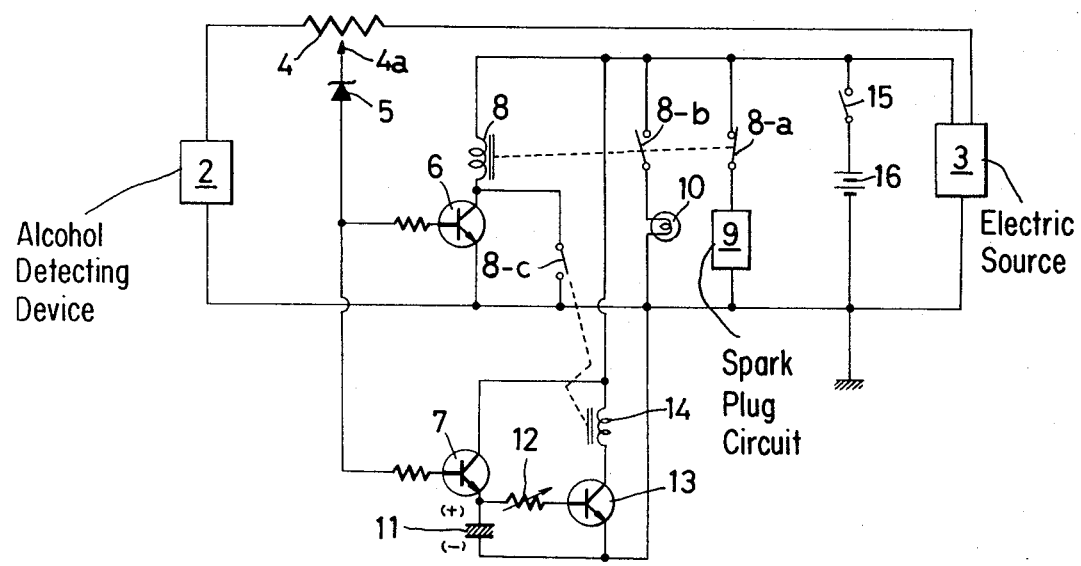
FIG. 3 is a control circuit diagram of the apparatus.

FIG. 3 shows a control circuit operable by an output signal of the detecting device 2 for rendering a motorcar inoperative. In the circuit, a variable resistance 4 and the detecting device 2 are connected in series with an electric source 3 (a DC-AC converter in the illustrated example), and a movable member 4a of the variable resistance 4 is connected through a Zener diode 5 to the base terminals of switching transistors 6, 7. The collector circuit of the transistor 6 is provided with a relay 8, and relay contacts 8a, 8b of the relay 8 are interposed in an engine spark plug circuit 9 and a circuit containing an indicator lamp 10, respectively. The transistor 7 is connected to a transistor 13 through a time constant circuit comprising a condenser 11 and a resistance 12, and a relay 14 is interposed in the collector circuit of the transistor 13 to open a self-holding relay contact 8c of the relay 8.

If, now, a driver in the driver's seat closes a main ignition switch 15 to start the engine, the breadth of the driver is sensed by the detecting device 2. The alcohol content of the breath of the driver causes the electric resistance of the detecting device 2 to be varied and the voltage across the resistance is varied correspondingly. If the potential of the movable member 4a thereby becomes greater than the Zener voltage of the Zener diode 5, the transistor 6 is switched "on" to operate the relay 8, whereby the ordinarily closed contact 8a thereof is opened to disconnect the spark plug circuit 9 from electric source 16. Thereby, spark plug firing becomes impossible and accordingly the motorcar is rendered inoperative. At the same time, the ordinarily open contact 8b is closed to indicate, via lamp 10, that the driver is drunk, and the contact 8c is also closed to maintain the operation of the relay 8.

If, now, another person who is not drunk sits in the driver's seat, the detecting device 2 no longer detects an excessive alcohol content and thereby the potential of the movable member 4a drops below the Zener voltage of the Zener diode 5 whereby the transistors 6, 7 are switched "off." Thereby, the electric charge of the condenser 11 is discharged through the circuit composed of the positive pole of condenser 11, resistor 12, transistor 13, and the negativepole of condenser 11 aaccording to the CR time constant decermined by the condenser 11 and the resistance 12, i.e. for example, about 10 – 15 seconds, and when the electric charge becomes less than a predetermined level, the transistor 13 is switched "on" to operate the relay 14. Accordingly, the self-holding contact 8c is opened by the relay 14 and the relay 8 becomes inoperative, as a result of which the relay contact 8a is closed and engine spark plug firing becomes possible.

The apparatus according to the invention thus renders the motorcar inoperative when a drunk person tries to drive the car, by opening the ignition circuit of the vehicle. Hence, accidents caused by drunken driving can be prevented. Moreover, since the incapacity of the vehicle is maintained for a predetermined length of time even after the detecting device no longer detects the presence of alcohol, theree is no hunting phenomenon in which the motocar is rendered inoperative when the driver exhales and operative when the drive r inhales. Thus the operation of the apparatus becomes stable. If a predetermined time period has elapsed after the detecting device no longer detects an excess alcohol content, the motorcar is automatically rendered operative, so that there is no inconvenience that the drive remains disabled should the drunk driver be replaced by a person who is not drunk and who might mistake the inoperative condition as being caused by vehicle malfunction.

What is claimed is:

1. Apparatus for preventing operation of a vehicle by a drunken driver, said apparatus comprising detecting means in a vehicle for detecting the alcohol content in the breath of a driver, further means coupled to the detecting means to render the vehicle inoperative when the detecting means senses the presence of alcohol in excessive amount, and release means coupled to said further means to render the vehicle operatiee after the passage of a predetermined period of time after the detecting means no longer senses the presence of excessive amount of alcohol, said further means comprising a control circuit containing said detecting means and an ignition circuit of the vehicle, and means for opening the ignition circuit when the detecting means senses excess alcohol, said detecting means including a detecting device having an electrical resistance which is a function of the alcohol content which is sensed, said control circuit including a normally inactive voltage-sensitive arrangement connected in series with said detecting device and rendered active when the detecting device senses an excess alcohol content, said arrangement being coupled to the means which opens the ignition circuit to effect such opening when the arrangement is operative, said release means being connected in said control circuit to said voltage-sensitive arrangement to delay closure of the ignition circuit for a predetermined period of time after the voltage sensitive arrangement is rendered inactive by reason of the detecting device no longer sensing the presence of excess alcohol.

2. Apparatus as claimed in claim 1 wherein said detecting means is positioned directly in front of the driver's seat of the vehicle.

3. Apparatus as claimed in claim 2 wherein the detecting means is positioned in the steering wheel of the vehicle.

4. Apparatus as claimed in claim 1 wherein said release means includes an R-C circuit arranged to effect said delay.

5. Apparatus as claimed in claim 1 wherein said control circuit includes an indicator lamp connected to the voltage-sensitive arrangement for being rendered operative when the latter arrangement is operative.

6. Apparatus as claimed in claim 1 wherein said voltage-sensitive arrangement includes a variable resistor connected in series with the detecting device, a Zener diode connected to said variable resistor and a relay in circuit connection with the Zener diode to open the ignition circuit of the vehicle.

* * * * *